No. 787,781.

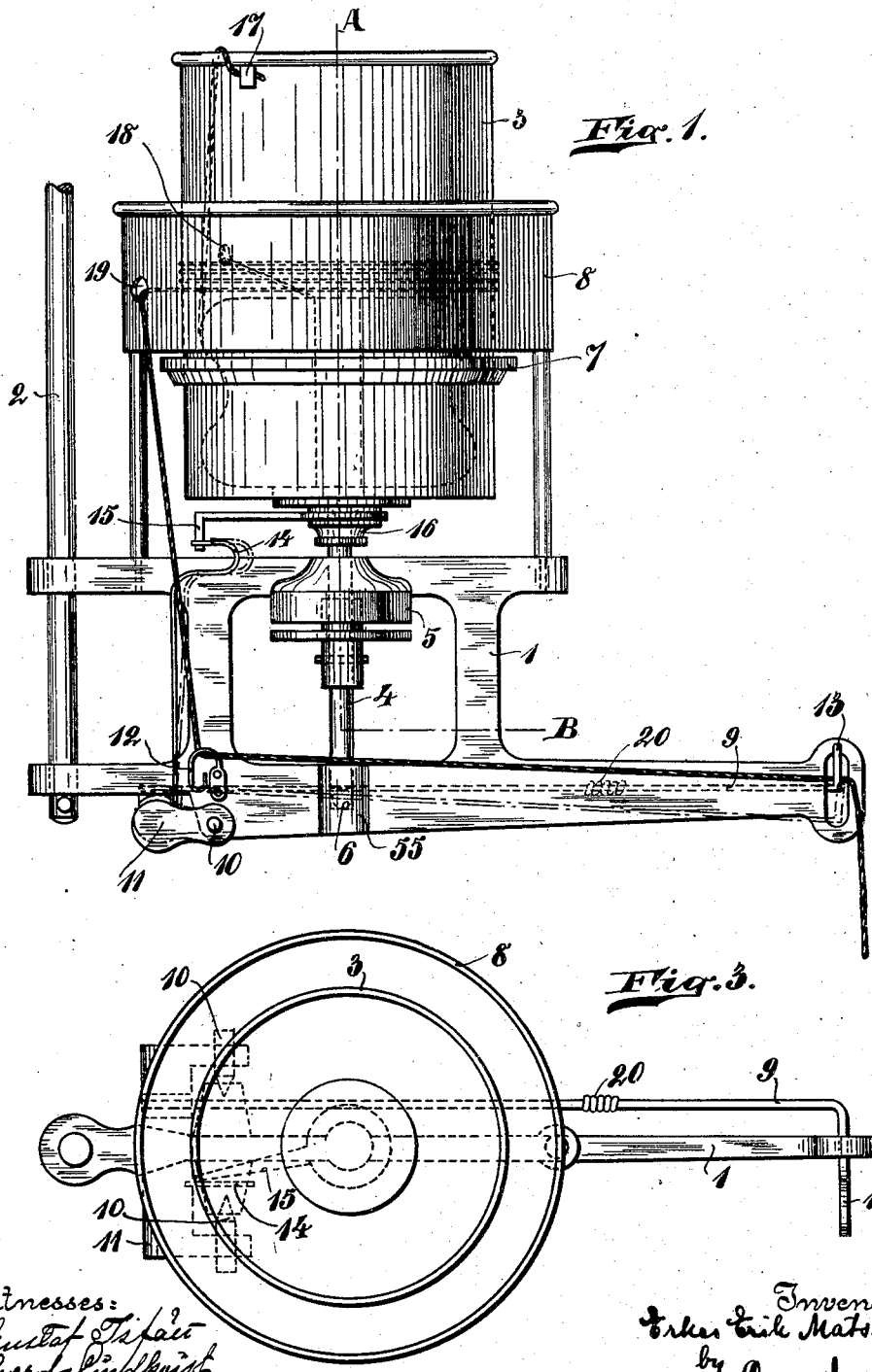

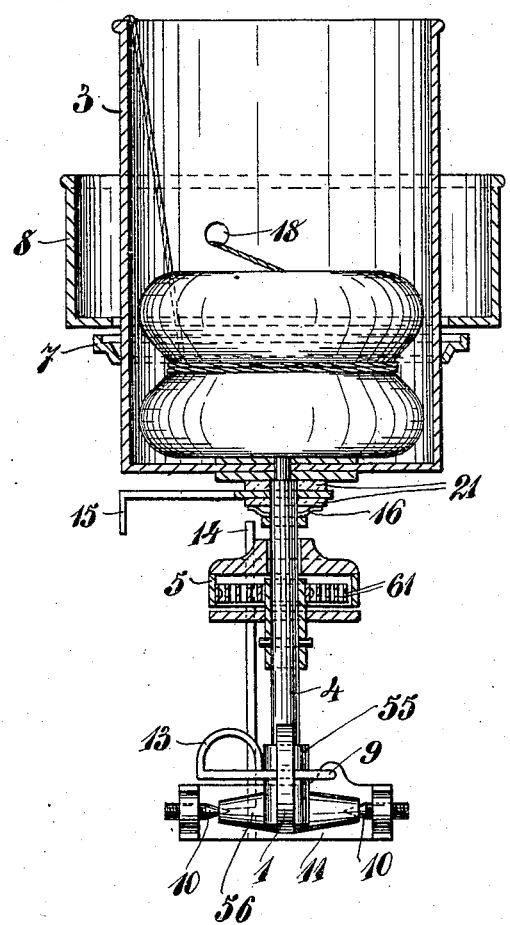

Patented April 18, 1905.

UNITED STATES PATENT OFFICE.

ERKES ERIK MATSSON, OF MORA, SWEDEN.

TWINE-HOLDER.

SPECIFICATION forming part of Letters Patent No. 787,781, dated April 18, 1905.

Application filed January 28, 1901. Serial No. 45,184.

*To all whom it may concern:*

Be it known that I, ERKES ERIK MATSSON, a subject of the King of Sweden and Norway, and a resident of Mora, Sweden, have invented new and useful Improvements in Twine-Holders, of which the following is a specification, reference being had to the drawings accompanying and forming part hereof.

The present invention relates to improvements in such rotary twine-holders as automatically withdraw by means of a spring or the like any excess of twine pulled out.

The object of my invention is to make possible such a regulation of said withdrawal that it will be interrupted when a certain length of twine hangs outside the holder.

The invention consists principally in providing a lever, balance, or the like through eyes or the like of which the twine has to pass in being withdrawn. Said lever is so pivoted and balanced that as long as the piece of twine hanging down from the end of the lever weighs down said end the withdrawal of the twine continues; but as soon as the end of twine hanging down from the end of the balance is too short to weigh down the said end of the balance the latter turns on its pivots and checks the rotation of the holder by means of a suitable stopper, brake, or the like, so that the withdrawal of the twine ceases.

The invention further consists in the combination and arrangement of parts hereinafter described and claimed.

In the accompanying drawings a twine-holder embodying my invention is shown.

Figure 1 shows the twine-holder in a side view. Fig. 2 shows a vertical section of said holder on line A B of Fig. 1, and Fig. 3 a top view of same.

The different parts of the apparatus are supported on a frame 1, which is secured, by means of a rod 2, for instance, to the ceiling. The holder for the ball of twine forms in known manner a rotatable cylinder 3, which is provided at the bottom with a central spindle or shaft 4, carried through a spring-box 5, secured to the frame and journaled with its lower end in a foot-bearing 55. The bottom of the said foot-bearing is suitably formed by a ball 6. In the spring-box 5 is placed a spiral spring 61, one end of which is attached to the said shaft, while its other end is secured to the wall of box 5 in the well-known manner. The cylinder 3 is provided at the outside with a flange 7, which keeps the twine wound about the cylinder 3 from sliding down. The cylinder 3 is, moreover, surrounded by a cylinder 8, secured to the frame 1 and serving to protect the twine wound onto the rotary cylinder 3, as well as a support for the twine. For the latter purpose said cylinder 8 is provided with a hole 19 in the side. Beneath the cylinder 3 the said frame is provided with a hub or the like 56 and an eye 12, said eye serving to guide the twine passing through the same. A swinging lever or balanced beam 9 is journaled, by means of conical pivots 10, in said hub. The said lever 9 is provided on the one end with a weight 11, serving to balance the beam, and on the other end with an eye 13. Said latter eye also serves to guide the end of twine which passes through the same. The last-mentioned end of said lever 9 is bent at right angle to the lever, and said bent end is passed through a perforation in the end of the frame 1. Attached to the said balance is an arm 14, which is so arranged that in the swinging of the balance the said arm is brought in or out of the way of an arm 15, secured to the said rotary holder. To avoid subjecting the rotary cylinder 3 to too sudden shocks when it is checked by the arm 14, the arm 15 may be connected with the shaft 4 by means of a friction-coupling. In the constructive form shown in the drawings this coupling consists of two disks of felting 21, between which one end of the arm 15 is located, and which are forced against the bottom of the holder by means of a springy collar and nut 16.

The working of the apparatus is as follows: The cylinder or holder 3 is turned so that the said spiral spring is wound up. A ball of twine is thereupon placed in the cylinder or holder 3 and its outer end fastened to the cylinder-wall—for instance, by means of a clip 17—while its inner end is carried through a hole 18, then through the hole 19 in the stationary cylinder 8, and finally through the eyes 12 and 13 of the balance 9. The weight 11 is so placed that it will balance, for instance, six feet of the twine hanging down from the eye 13 at the outer end of the balance 9. Accordingly when this part of the twine falls short of six feet the balance by means of its weight 11 will hold the arm 14 in the position indicated by full-drawn lines, so that the said arm 14 stands in the way of the arm 15. The cylinder 3 therefore cannot be set in rotation by the spring 61. On the other hand, when the piece of twine hanging down from the eye 13 exceeds six feet in length the balance 9 is weighted down by the twine so that the arm 14 is held in the position indicated by dotted lines. The arm 14 then is not in the way of arm 15, and consequently the cylinder 3 can be rotated by the spring 61, so as to wind the twine extracted onto the cylinder 3 until the weight 11 can once more overcome the weight of the twine hanging down from the eye 13. With a view to varying the length of twine to be balanced by the weight 11 a shifting weight 20 may be provided on the beam 9 or the weight 11 be adjustable.

When a ball of twine has been entirely consumed in the holder 3, the end of it which is still fast in the clip is tied to the inner end of a fresh ball. The latter is subsequently placed in the holder and its outer end introduced in the clip 17 and the apparatus is again ready for continued use.

Having now described my invention and how it may be carried out, I claim—

1. The combination with a twine-holder having a turnable ball-box for the twine, and a motor adapted to cause the said ball-box to coil back the extracted twine when released, of a balanced beam adapted to carry the free end of the twine, and means on said balanced beam for stopping the rotation of the ball-box when the end of twine hanging down from the said balanced beam becomes too short to weigh down the end of the beam from which it hangs down, substantially as and for the purpose set forth.

2. The combination with a twine-holder having a turnable ball-box for the twine, and a motor adapted to cause the said ball-box to coil back the extracted twine, of a balanced beam adapted to carry the free end of the twine, means on said balanced beam for stopping the rotation of the ball-box when the end of twine hanging down from the said balanced beam becomes too short to weigh down the end of the beam from which it hangs down, and a weight on said beam, substantially as and for the purpose set forth.

3. In a twine-holder, the combination of, a frame, a cylinder, an axle for said cylinder journaled in said frame, a spiral spring attached to said axle and frame, a balanced beam pivoted to said frame, an eye on said beam, an arm extending from said axle, a friction-coupling on said axle adapted to connect one end of said arm to said axle, and an arm attached to said beam and adapted to engage with the first-mentioned arm, substantially as and for the purpose set forth.

4. In a twine-holder the combination of, a frame, a cylinder, an axle for said cylinder journaled in said frame, a spiral spring attached to said axle and frame, a balanced beam pivoted to said frame, a weight on said balanced beam, an eye on said balanced beam, an arm extending from said axle, a friction-coupling on said axle adapted to connect the said arm to said axle, and an arm attached to said balanced beam and adapted to engage with the first-mentioned arm, substantially as and for the purpose set forth.

In testimony whereof I have signed my name to this specification in presence of two subscribing witnesses.

ERKES ERIK MATSSON.

Witnesses:
GUSTAF ISFÁU,
CARL CARLSSON.